United States Patent [19]

Hesse et al.

[11] 4,302,380

[45] Nov. 24, 1981

[54] LOW-SHRINKAGE, ACID-HARDENING MIXTURES OF FURAN CEMENTS AND PROCESS FOR THE PREPARATION THEREOF

[75] Inventors: Wolfgang Hesse, Wiesbaden; Guido Lorentz, Butzbach; Klaus Rauhut, Wiesbaden, all of Fed. Rep. of Germany

[73] Assignee: Hoechst Aktiengesellschaft, Frankfurt am Main, Fed. Rep. of Germany

[21] Appl. No.: 162,803

[22] Filed: Jun. 25, 1980

[30] Foreign Application Priority Data

Jun. 28, 1979 [DE] Fed. Rep. of Germany ....... 2926053

[51] Int. Cl.$^3$ ............................................... C08L 61/10
[52] U.S. Cl. .................................... 260/38; 525/481; 525/502
[58] Field of Search .................. 260/38; 525/481, 502

[56] References Cited

U.S. PATENT DOCUMENTS 3,244,648  4/1966  Bornstein ............................ 525/481

3,755,229  8/1973  Johnson et al. ...................... 260/38

Primary Examiner—Lewis T. Jacobs
Attorney, Agent, or Firm—Hammond & Littell, Weissenberger and Muserlian

[57] ABSTRACT

An acid-hardening low shrinkage cement based on a furan-modified phenolic resin containing as a binder (A) a reaction product of furfuryl alcohol with a hydroxymethyl group-containing substituted phenol resol, based on a substituted phenol selected from the group consisting of bifunctional alkylphenol, an aralkylphenol each having 3 to 20 carbon atoms in the alkyl radical, an arylphenol or a combination thereof with a minor amount of one or more unsubstituted phenols, wherein in the substituted phenol resol at least 75% of the reactive H-atoms of the nucleus are substituted by reaction with formaldehyde and wherein more than 0.5 mol of furfuryl alcohol has been reacted per hydroxymethyl group; together with (B) at least one reactive diluent in a weight ratio of (B):(A) in the range from (0.4 to 1.5):1, and a process for the preparation of said composition.

11 Claims, No Drawings

LOW-SHRINKAGE, ACID-HARDENING MIXTURES OF FURAN CEMENTS AND PROCESS FOR THE PREPARATION THEREOF

The invention relates to acid-hardening mixtures containing furan resins as the binder.

It is known to use polycondensates of furfuryl alcohol as the binder for acid-hardening cements. The second main component of the cement consists of fillers, with which acids or acid-producing substances are admixed as catalysts which bring about hardening without the need to supply heat.

Processing to form the cement takes place in such a way that a solution of the furan resin is mixed with the filler and catalyst or hardener (hereinafter the mixture of filler and catalyst is termed "filler") immediately prior to use and the cement obtained is applied by conventional methods to or between the materials to be adhered. In order to evaluate the cement, the characteristics of the furan resin, the characteristics of the cement after mixing the furan resin with the filler, the hardening process and the chemical and physical properties of the end product are observed. The furan resin must have a low degree of condensation so that it flows with low viscosity and wets the filler well. It must have a good storage life for the same reason. The degree of condensation may only increase slightly during storage, because an excessive viscosity rise would lead to inferior wetting of the filler and therefore to processing faults. After mixing the filler with the furan resin, the furan resin molecule is immediately enlarged due to catalyst action and this leads to a loss of processing consistency. The time between the mixing process and the loss, called the working life, should generally be between ½ and 2 hours in order to permit easy processing. After processing, the cement must harden at ambient temperature in a minimum time and must become stable with respect to chemicals and solvents.

The furan resins hitherto conventionally used for producing acid-hardening cements, give cements with an excellent chemical stability. Furan cements are in particular absolutely resistant to alkalis. However, the disadvantage of furan cements is that the thermal stability is often limited to 180° to appproximately 230° C. and in addition they are subject to excessive shrinkage after processing. This subsequent shrinkage is so great that in the production of acid-resistant floor or wall coverings, furan resins can cause problems due to separation of the sheet sides and transverse cracks in the joints. It would therefore be advantageous to have a cement which did not have these disadvantages.

It is also known to modify furan resins in many different ways. Thus, furfuraldehyde can be reacted with phenol to form novolaks which can be used in the production of phenolic resin moulding materials. However, these resins cannot be used for cements due to their too high intrinsic viscosity. It is also known to modify furfuryl alcohol condensates with urea and formaldehyde and use these condensates as core sand binders. However, the known incorporation of phenol into this modification does not alter the inadequate chemical stability and thermal stability of such polycondensates which is necessary in the production of core sand binders.

The already described reaction of furfuryl alcohol with phenol or with resorcinol does not lead to suitable cement resins and instead the resins obtained can be used as binders for glues, sizes, moulding materials or varnishes. Also the reaction between phenols or hydroxybenzyl alcohol and furfuryl alcohol does not provide a useable cement resin. On attempting to mix such polycondensates with a filler containing acid catalysts, there is a violent polycondensation reaction corresponding to that of unmodified furfuryl alcohol or furfuryl alcohol converted into resins. The hardening product obtained in this way shrinks and is not resistant to alkalis.

On account of the disadvantages referred to above, the production of furan resins for cements has not previously been described.

The present invention provides an acid-hardening low-shrinkage mixture for cements based on furan-modified phenolic resin
containing as a binder
(A) a reaction product of furfuryl alcohol with a hydroxymethyl group-containing substituted phenol resol, based on a substituted phenol selected from the group consisting of a bifunctional alkylphenol, an aralkylphenol each having 3 to 20 carbon atoms in the alkyl radical, an arylphenol or a combination thereof with a minor amount of one or more unsubstituted phenols, wherein the substituted phenol resol at least 75% of the reactive H-atoms of the nucleus are substituted by reaction with formaldehyde and wherein more than 0.5 mol of furfuryl alcohol has been reacted per hydroxymethyl group; together with
(B) at least one reactive diluent in a weight ratio of (B):(A) in the range from (0.4 to 1.5):1. A further object of the invention is also
an acid-hardening low shrinkage cement based on a furan-modified phenolic resin containing as essential ingredients
(A) a reaction product of furfuryl alcohol with a hydroxymethyl group-containing substituted phenol resol, based on a substituted phenol selected from the group consisting of a bifunctional alkylphenol, an aralkylphenol each having 3 to 20 carbon atoms in the alkyl radical, an arylphenol or a combination thereof with a minor amount of one or more unsubstituted phenols, wherein in the substituted phenol resol at least 75% of the reactive H-atoms of the nucleus are substituted by reaction with formaldehyde and wherein more than 0.5 mol of furfuryl alcohol has been reacted per hydroxymethyl group; together with
(B) at least one reactive diluent in a weight ratio of (B):(A) in the range from (0.4 to 1.5):1,
(C) at least one filler; and
(D) at least one hardener;
the weight ratio of the sum of the components (A) and (B) to the sum of components (C) and (D) being 1:(1to 7) and preferably 1:(1.5 to 5).

It has surprisingly been found that cements made from mixtures according to the invention have a long storage life as well as all the above-mentioned positive characteristics of furan resin cements, an excellent chemical stability and, unlike the hitherto known adhesives, thermal stability up to 320° C. In addition, they are subject to very limited shrinkage. When the subsequent shrinkage is measured in accordance with ASTM C 358 they give much lower values than conventional furan adhesives. In addition, they have a good working life, a reduced hardening time and an extremely high resistance to chemicals.

The alkylphenols to be used for the alkylphenol resol are bifunctional. It is possible to use para- or orthomonoalkylphenols such as o-propyl-, o-isopropyl-, o-n-butyl-, o-sec- or -tert.-butyl-, o-isononyl-, p-n- or -tert-butyl-, p-n-hexyl-, p-cyclohexyl-, p-isooctyl-, p-isononyl- and p-isododecylphenols, as well as arylphenols such as o- or p-phenylphenol, or aralkylphenols such as o- and p-substitution products of styrene and other vinyl aromatic substances such as α-methyl-styrene or vinyltoluene with phenol, either individually or mixed with one another. The alkyl radicals may be cyclic, straight or branched chain and contaion 3 to 20, preferably 4 to 12 C-atoms. The phenolic component can also contain minor quantities of higher-alkylated phenols, such as dialkyl- and/or trialkylphenols (provided that they still have at least one position available for the reaction with formaldehyde), or unsubstituted phenols or polyvalent phenols, e.g. diphenylolpropane, and specificially in a quantity up to 30 mol %. It is also possible to use those alkylphenols, e.g. also as mixtures, obtained during the alkylation of phenol with unsaturated compounds, e.g. alkylenes with 3to 20 C-atoms.

The invention also provides a process for the preparation of cements, wherein furfuryl alcohol is reacted with a hydroxymethyl group-containing alkylphenol resol of the type referred to hereinbefore as component (A) at an elevated temperature, the reaction product is dissolved in a reactive diluent so that this solution generally has a solids content of 40 to 70% by weight, and immediately prior to the use thereof the solution is mixed with a filler and a hardener, the weight ratio of the components being in the range indicated hereinbefore.

The modified furan resins are added to the reactive diluents to give a solution, e.g. to benzyl alcohol, low molecular weight epoxy compounds such as phenyl glycidyl ether, diphenylolpropane-diglycidyl ether and in particular to furan compounds such as furfuryl aldehyde, difuryl ether and preferably furfuryl alcohol. The latter can be present as a surplus component e.g. from the reaction with the resol.

The filler may comprise for example, rock powder, barite, quartz powder and preferably coke dust or graphite powder, e.g. in the form of synthetic graphite.

Examples of hardening catalysts include (a) acids, such as sulphuric acid, hydrochloric acid, phosphoric acid, oxalic acid, sulphonic acids, such as sulphamic acid, and mono- and disulphonic acids of benzene, toluene, xylene, as well as naphthalene-disulphonic acid; and/or (b) acid-producing substances such as sulphochlorides of the sulphonic acids referred to under (a), e.g. toluene or benzene sulphochloride, alkyl esters of these sulphonic acids or acid sulphates; and/or (c) acid salts of sulphuric or phosphoric acid, preferably their sodium salts. The proportion of catalyst is generally 0.1 to 1, preferably 0.2 to 0.5 equivalent, based on the phenolic hydroxyl group.

The hydroxymethyl group-containing resol used as the starting substance may be prepared from the phenolic resin component and more than 1.5, preferably 2, mol of formaldehyde per phenolic group, in the presence of basic condensation catalysts under conditions substantially preventing the formation of higher condensates. Generally, the thus obtained furan-modified phenolic resins have a viscosity of 100 to 10,000, preferably 200 to 4,000 mPa.s/20° C. For the purpose of this condenstion, it is advantageous to use moderate reaction temperatures between 20° and 80° C., preferably between 30° and 60° C., as well as a relatively high catalyst concentration, e.g. 5 to 100, preferably 10 to 50 and in particular 16 to 30 equivalent %, in each case based on the phenolic OH groups. Suitable catalysts for this reaction are conventional bases such as alkali metal hydroxides, alkaline-earth metal hydroxides or tertiary amines and quaternary ammonium bases. Following the condensation, the catalyst is for example neutralized with organic or inorganic acids and the resulting salt is removed by washing out.

The reaction of the polyhydroxymethyl-alkylphenols with furfuryl alcohol in accordance with the invention generally takes place at an elevated temperature, e.g. at up to 220 and preferably up to 190° C., accompanied by the simultaneous removal of water formed during the reaction. It takes place at approximately 100° to 120° C. The water may be removed with a distillation column, the water being preferably distilled off azeotropically in the presence of an entrainer. The entrainer may be selected from aromatic substances, such as toluene or xylene or aliphatic hydrocarbons or other substances which are not miscible with water, e.g. those used as solvents in the preparation of the resins. According to another embodiment, the reaction between the furfuryl alcohol and the resol can take place in a melt, but reaction in solvents is preferred.

The resin formed with dehydration is thermally very stable and is able to withstand without difficulty the reaction temperature used, which can be up to 220° C. However, this is the case only if, in accordance with the invention, the starting substances used are alkylated phenols, whose functionality relative to formaldehyde is at most 2. If the starting substance was constituted solely by polyfunctional phenols, e.g. phenol, diphenylolpropane, resorcinol, cresol or other compounds which are more than bifunctional with respect to formaldehyde, the reaction would only be performed when working with a considerable formaldehyde deficiency. However, this would lead to unusable products. However, the reaction to hydroxymethyl compounds can be preceded by an acid-catalysed reaction of the alkylphenol with formaldehyde to form novolaks, provided that no more than 0.7 and preferably no more than 0.5 mol of formaldehyde is used per mol of alkylphenol. The thus formed novolak would then be reacted to form a resol in a second stage under the aforementioned alkaline conditions using further formaldehyde.

The reaction according to the invention can be performed in the presence of a furfuryl alcohol excess, i.e. using more than 1 mol of furfuryl alcohol per mol of hydroxymethyl. The excess furfuryl alcohol can remain in the resin as a reactive diluent. The proportions can also be selected in such a way that the furfuryl alcohol excess is sufficiently large that it is adequate to dilute the resin after the reaction and optionally after removing the entrainer. However, it is also possible to subsequently add the reactive diluent.

The storage stability of the resin solutions is virtually unlimited. The cement is prepared by mixing the furan resin solution with the filler immediately prior to use.

The invention is illustrated by the following examples, in which parts and percentages are by weight.

EXAMPLES

EXAMPLE 1

(1a) Preparation of the resin: nonylphenol-modified resin

792 Parts of mononoylphenol containing 2% of dinonylphenol, 45.6 parts of diphenylolpropane and 400 parts of xylene are mixed in a reaction vessel equipped with a stirrer, thermometer, metering device, water separator, reflux condensor and a vacuum distillation apparatus and heated to 50° C. 120 Parts of 33% sodium hydroxide solution are then allowed to flow in and the temperature rises to 60° C. 648 Parts of 37% aqueous formaldehyde are then added, as a function of the exothermic reaction. After 6 hours stirring at 60° C., the free formaldehyde content is 2%. The mixture is then adjusted to pH 5.5 with 178 parts of 25% sulphuric acid and the separating aqueous phase is sucked off. 784 Parts of furfuryl alcohol are added and the water separator receiver is filled with xylene.

Accompanied by recycling of the solvent distillation takes place under normal pressure and the temperature is raised to 170° C. by gradually removing the xylene. 205 ml of an aqueous phase are obtained which is discarded. This is followed by cooling to 130° C. and the remaining entrainer is distilled off at a pressure of 25 mbar and 1 119 parts of furfuryl alcohol are added. The resin solution is obtained with a yield of 2 466 parts and has a residue of 50% (1 hour/170° C.). The viscosity is 775 mPa.s/20° C.

(b) Preparation of the cement

For the purposes of the cement test, a filler-catalyst mixture is prepared from 93.5 parts of coke dust, 0.5 parts of crystalline phosphoric acid, 4 parts of amidosulfonic acid and 2 parts of oxalic acid by processing in a drum mixer. 100 Parts of this adhesive powder are mixed by stirring with 55 parts of the resin solution from (a) to give a useful cement having a working life of 45 minutes. After 36 hours, a Shore hardness D of 40 is reached.

(c) Physical test

To determine the chemical stability, cylindrical testpieces having a height and a diameter of 25 mm are prepared from the cement and they are stored at ambient temperature for 8 days. After this time, the testpieces are stable to boiling 70% sulphuric acid, boiling concentrated hydrochloric acid, hot concentrated phosphoric acid at 130° C., concentrated and dilute sodium hydroxide solutions and other alkaline solutions, as well as polar organic solvents such as acetone and butyl acetate. The measurement of the linear shrinkage is performed on cylindrical testpieces with a diameter of 25 mm and a height of 90 mm on whose ends glass measuring marks are made. The total length of the testpiece, including the marks, is approximately 100 mm. Testing is in accordance with ASTM C358. The first length measurement takes place 24 hours after producing the testpieces and is used as a basic value. Over an observation period of 209 days, shrinkage at ambient temperature is 0.2%. If the testpieces are stored at 60° C., the shrinkage after 200 days is 0.22%.

EXAMPLE 2

(a) Preparation of the resin: butylphenol-modified resin 1 200 Parts of p-tert-butylphenol, 800 parts of xylene, 240 parts of sodium hydroxide solution and 1 296 parts of 37% aqueous formaldehyde are reacted as in Example 1 in the apparatus of Example 1 until the formaldehyde content is 1.7%. Then, as in Example 1, the pH is adjusted to 5.5 with 25% sulphuric acid, followed by working up. 1 568 Parts of furfuryl alcohol are then added and 450 ml of aqueous phase is azeotropically distilled off at maximum temperature of 177° C. as in Example 1. After distilling off the entrainer at 130° C./100 mbar, 1 225 parts of furfuryl alcohol are added and 3 890 parts of a furan resin solution are obtained having a residue of 60% (1 hour/170° C.) and a viscosity of 4 750 mPa.s/20° C.

(b) Preparation of the cement

A cement powder is prepared from 93 parts of carbon, 2 parts of oxalic acid, 1 part of crystalline phosphoric acid and 4 parts of an aromatic sulphochloride for the cement test. For producing the cement, 45.8 parts of the 60% resin solution from (a) are diluted with 92 parts for furfuraldehyde and this solution is mixed with 100 parts of the cement powder. The resulting cement has a working life of 60 minutes. After 36 hours, it has a Shore D hardness of approximately 45.

(c) Physical test

Testpieces corresponding to Example 1 are produced for the chemical test and for measuring the subsequent shrinkage based on ASTM C358 and are stored for 8 days at ambient temperature. The testpieces are stable to boiling 70% sulphuric acid, boiling concentrated hydrochloric acid, boiling acetic acid, boiling concentrated and dilute sodium hydroxide solutions and boiling toluene and boiling ethyl acetate. If, in addition to storing at ambient temperature for 8 days, the testpieces are also kept for 16 hours at 90° C., they are also stable to acetone and chlorinated hydrocarbons.

After storing for 61 days at ambient temperature, shrinkage is only 0.1% and after storing at 60° C. the testpieces have no shrinkage after 28 days.

EXAMPLE 3

(a) Preparation of a nonylphenol-modified resin

Using the apparatus of Example 1, 1 760 parts of mononoylphenol containing 2% of dinonylphenol, 800 parts of xylene, 240 parts of 33% sodium hydroxide solution and 1 166 parts of formaldehyde are reacted at 60° C., until the formaldehyde content is 2%. After neutralizing the mixture with 25% sulphuric acid, the aqueous phase is separated, the resin is mixed with 1 568 parts of furfuryl alcohol and subsequently the aqueous phase is distilled off at a maximum temperature of 182° C., as in Example 1. After removing the entrainer as in Example 1 and diluting the mixture with 1 187 parts of furfuryl alcohol, 5 170 parts of a furan resin solution are obtained. The latter has a residue of 50.2% (1 hour/170° C.) and a viscosity of 500 mPa.s/20° C.

(b) and (c) Preparation of the cement and physical test

In accordance with Example 2, testpieces are prepared from the cement powder of Example 2 and are used for measuring the chemical stability and shrinkage. The chemical stability tests give the same results as in Example 2, but the conditioning time at 90° C. to give stability relative to chloroform and acetone can be reduced to 8 hours. After 60 days at ambient temperature, the shrinkage is 0.1% and after 28 days at 60° C. there is no shrinkage.

EXAMPLE 4

(a) Preparation of a styrylphenol-modified resin

The apparatus of Example 1 is switched to reflux. 752 Parts of phenol are melted and mixed with 0.8 parts of concentrated sulphuric acid. The mixture is heated to 100° C. and 832 parts of styrene are gradually added, as a function of the exothermic reaction. The temperature rises to 140° C. When all the styrene has been added, a temperature of 140° C. is maintained for 1 hour and then the mixture is cooled to 60° C. During cooling, 240 parts of 33% sodium hydroxide solution are added. On reaching 60° C., 1 296 parts of 37% aqueous formaldehyde are added over one hour, as a function of the exothermic reaction and reaction takes place at 60° C. until the free formaldehyde content is 1.8% after 4 hours. The pH is adjusted to 5.2 using 317 parts of 25% sulphuric acid. 800 parts of toluene are stirred in and the aqueous phase is then removed by suction. 1 568 parts of furfuryl alochol are added to the resin left behind in the flask, followed by switching over to circulation distillation (with recycling of the solvent) and the water separator receiver is filled with toluene. 667 parts of the aqueous phase are removed by distillation, the temperature rising to 160° C. After cooling to 110° C. the entrainer is distilled off at a pressure of 100 mbar and the mixture is then diluted with 1 084 parts of furfuryl alcohol. The furan resin solution obtained (3 988 parts) has a residue of 60.1% (1 hour/170° C.) and a viscosity of 6 057 mPa. s/20° C.

(b) and (c) Preparation of the cement and physical test 45.8 parts of the resin solution are mixed with 9.2 parts of furfuryl alcohol and 100 parts of the cement powder of Example 2 for the purpose of the cement test. The cement has a working life of 55 minutes and has a Shore D hardness of 38 after storing for 24 hours at ambient temperature. The chemical stability tests give the same results as in Example 2, but the conditioning time at 90° C. to give stability with respect to chloroform and acetone can be reduced to 8 hours. Shrinkage is only 0.1% at ambient temperature after 60 days, whereas after 28 days at 60% there is no shrinkage and in fact the testpieces have expanded by 0.004%.

We claim:

1. An acid-hardening low shrinkage cement based on a furan-modified phenolic resin containing as a binder
(A) a reaction product of furfuryl alcohol with a hydroxymethyl group-containing substituted phenol resol, based on a substituted phenol selected from the group consisting of a bifunctional alkylphenol, an aralkylphenol each having 3 to 20 carbon atoms in the alkyl radical, an arylphenol or a combination thereof with a minor amount of one or more unsubstituted phenols, wherein in the substituted phenol resol at least 75% of the reactive H-atoms of the nucleus are substituted by reaction with formaldehyde and wherein more than 0.5 mol of furfuryl alcohol has been reacted per hydroxymethyl group; together with
(B) at least one reactive diluent in a weight ratio of (B):(A) in the range from (0.4 to 1.5):1.

2. An acid-hardening low shrinkage cement based on a furan-modified phenolic resin as claimed in claim 1 as essential ingredients
(A) a reaction product of furfuryl alcohol with a hydroxymethyl group-containing substituted phenol resol, based on a substituted phenol selected from the group consisting of a bifunctional alkylphenol, an aralkylphenol each having 3 to 20 carbon atoms in the alkyl radical, an arylphenol or a combination thereof with a minor amount of one or more unsubstituted phenols, wherein in the substituted phenol resol at least 75% of the reactive H-atoms of the nucleus are substituted by reaction with formaldehyde and wherein more than 0.5 mol of furfuryl alcohol has been reacted per hydroxymethyl group; together with
(B) at least one reactive diluent in a weight ratio of (B):(A) in the range from (0.4 to 1.5):1,
(C) at least one filler,
(D) at least one hardener,
the weight ratio of the total of components (A+B) to the total of components (C+D) being 1:(1 to 7).

3. A composition as claimed in claim 1, wherein at least one of the features referred to in claim 1 is modified by a feature selected from the group consisting of
(a) the bifunctional alkyl- or aralkylphenol has an alkyl group having 4 to 12 carbon atoms,
(b) 90 to 100% of the reactive H-atoms of the nucleus of the substituted phenol resol are substituted by reaction with formaldehyde.
(c) more than 0.8 mol of furfuryl alcohol have been reacted per hydroxymethyl group and
(d) the weight ratio of the total of components (A+B) to the total of components (C+D) is 1:(1.5 to 5).

4. A composition as claimed in claim 1, wherein the furan-modified phenol resin has a viscosity between 100 and 10,000 mPa.s/20° C.

5. A composition as claimed in claim 1, wherein the aralkylphenol in the phenol resin is a substitution product of phenol and a vinylaromatic compound.

6. A composition as claimed in claim 1, wherein the reactive diluent is a furan compound.

7. A composition as claimed in claim 1, wherein the hardener is an acid substance being present in an amount between 0.1 and 1 equivalent, referred to the phenolic hydroxy groups.

8. A composition as claimed in claim 1, wherein at least one filler selected from the group consisting of coke, synthetic graphite, quartz and barium sulfate is present.

9. A process for the preparation of a composition as claimed in claim 1, wherein furfuryl alcohol is reacted at an elevated temperature with a substituted phenol resol containing hydroxymethyl groups and based on a bi-functional alkyl- or aralkylphenol having 3 to 20 carbon atoms in the alkyl radical or arylphenol or a combination thereof with a minor amount of at least one unsubstituted phenol, wherein in the alkylphenol resol at least 75% of the reactive H-atoms of the nucleus are substituted by reaction with formaldehyde and wherein per hydroxymethyl group more than 0.5 mol of furfuryl alcohol have been reacted, the reaction product is then dissolved in the reactive diluent and, immediately prior to its application this obtained solution is mixed with a filler and a hardener, wherein the weight ratio of the total of components (A+B) to that of the total of components (C+D) is 1:(1 to 7).

10. A process as claimed in claim 9, wherein the filler is added in the form of a mixture with the hardener.

11. A process as claimed in claim 9 or 10, wherein the solution of the resin in the reactive diluent has a solids content between 40 to 77% by weight.

* * * * *

UNITED STATES PATENT AND TRADEMARK OFFICE
CERTIFICATE OF CORRECTION

PATENT NO. : 4,302,380
DATED : November 24, 1981
INVENTOR(S) : WOLFGANG HESSE ET AL.

It is certified that error appears in the above—identified patent and that said Letters Patent is hereby corrected as shown below:

Column 3, line 10: "contaion" should read -- contain --.

Column 7, line 34: Delete "6".

Column 7, line 35: "057" should read -- 6 057 --.

Signed and Sealed this

Fifteenth Day of June 1982

[SEAL]

Attest:

GERALD J. MOSSINGHOFF

Attesting Officer          Commissioner of Patents and Trademarks